INVENTOR.
ROBERT W. BLANCHARD
BY George C. Sullivan
Agent

Sept. 8, 1970 R. W. BLANCHARD 3,527,881

OPTICAL IMAGING APPARATUS UTILIZING LOGIC CIRCUITRY FOR BLANKING PORTIONS OF VIDEO DISPLAYS

Filed Aug. 3, 1967 6 Sheets-Sheet 2

INVENTOR.
ROBERT W. BLANCHARD
BY
George Sullivan
Agent

INVENTOR.
ROBERT W. BLANCHARD
BY George C. Sullivan
Agent

INVENTOR.
ROBERT W. BLANCHARD
BY George Sullivan
Agent

INVENTOR.
ROBERT W. BLANCHARD
BY George Sullivan
Agent

Sept. 8, 1970 R. W. BLANCHARD 3,527,881

OPTICAL IMAGING APPARATUS UTILIZING LOGIC CIRCUITRY FOR BLANKING PORTIONS OF VIDEO DISPLAYS

Filed Aug. 3, 1967 6 Sheets-Sheet 6

INVENTOR.
ROBERT W. BLANCHARD
BY George C. Sullivan
Agent 3,527,881

OPTICAL IMAGING APPARATUS UTILIZING LOGIC CIRCUITRY FOR BLANKING PORTIONS OF VIDEO DISPLAYS

Robert W. Blanchard, Los Gatos, Calif. assignor to Lockheed Aircraft Corporation, Burbank, Calif.

Filed Aug. 3, 1967, Ser. No. 658,132
Int. Cl. H04n 1/38, 3/24, 7/14
U.S. Cl. 178—6 6 Claims

ABSTRACT OF THE DISCLOSURE

The optical imaging apparatus of the present invention utilizes logic circuitry for blanking selected portions of the video display screen of an associated system. Those areas of the screen which are illuminated present an object viewed by the apparatus during underwater exploration. The various logic circuits which the apparatus utilizes provides the correct timing sequences for both the horizontal and/or vertical sweeps for illumination of the screen only in preselected areas.

PRIOR ART AND SPECIFICATION

The advent of underwater exploration has created the necessity for the development of visual aids and systems which may be employed to view ocean floors at depths heretofore thought to be impossible owing to the presence of various disturbances or forward scatter and backscatter associated with transmission and reception of quality light signals. In this regard great expenditures of time, effort and monies have been made in the formulation of highly complex and costly systems which are directed toward providing a video display at some remote location from the location being surveyed on the ocean floor. To date the only apparent techniques available for use to help solve the problems of underwater exploration are similar to those techniques which have traditionally been used in connection with radar systems.

For example, radar ranging and blanking circuits in the prior art have been used for blanking video signals to the input of tracking circuits which represent targets beyond the range of a selected target. In many of these radar equipments the function is not only as target locating range measuring systems but also as automatic target tracking systems. In these automatic target tracking systems, the radar antenna as well as weapons may be continuously, automatically, and accurately trained on a target. However, instability exists in such radar tracking equipment to discriminate between the selected target, and undesired targets often produce tracking information which causes the equipment to track the wrong target and to completely lose the selected target.

To overcome this undesirable feature of tracking of false targets many systems have used circuitry wherein the reception by the tracking system has been predicated on the use of pulse echoes from the target having a range greater than that of the first or selected target. This has been done by blanking or disabling the input circuit or the range of the tracking signal almost immediately after the pulse echo from the selected target is received. Thus, this type of prior art has required the use of a pulsed radar system which is rather complicated and in many instances unstable, unsatisfactory and totally useless in optical imaging.

In other radar target tracking systems a selected moving target is manually centered within a generated target tracking display area and automatically remains centered therein as the display area tracks said moving target. Auxiliary circuitry actuated by television system horizontal and vertical drive signals generate a small target tracking area which is also displayed on the television monitor. The tracking area is manually positioned such that a selected target to be tracked is centered therein. As the target moves, appropriate video signals are coupled to the before mentioned video amplifier, the output of which subsequently produces suitable signals causing the tracking area to automatically track the selected target. The generated target area appears on the television monitor as an intensification of its scanning beam while the selected target centered therein appears as a further beam modulation.

Although the foregoing radar system techniques may be viewed as aids to underwater optical systems, it is obvious that the radar art and optic art are not the same. Consequently little, if any, significant success could be expected to be achieved from such considerations and approaches. The difficulty may be said to arise primarily because the media through which radar and light waves propagate are not the same and the problems encountered in each art are different.

Another more germane technique which has been utilized unsatisfactorily for underwater exploration consists of employing high power floodlights to illuminate underwater targets and to take pictures thereof while they are still illuminated. Such techniques have failed to provide the desired result owing to the presence of "backscatter" or what is more commonly known as "signal-to-background noise ratio." More particularly, when a wide-angle sensor, such as photographic or television cameras, for example, are used with a wide-angle light source, such as a floodlight for example, contrast is greatly reduced by veiling glare from the great volume of illuminated water between the target being illuminated and the light sensor. It has been found that the visibility range under ideal water conditions is severely limited. This limitation persists even when the volume scattering function of the water is minimized by maintaining the source-target-sensor angle near 90 degrees, which has been determined to be the ideal angular space relationship to obtain minimum backscatter.

A detail study of the subject has revealed that the elimination or control of backscatter would not be enough to provide the desired result. The "forward scatter" resulting from sea water which is illuminated by a wide angle light source also significantly contributes to the problem. The forward scatter may be said to arise from the effects of the presence of inorganic and organic scattering centers and refractance elements present in sea water.

Still another element of the problem is caused by loss of light energy due to attenuation, which may be defined as a combination of energy absorption and scattering in sea water. This phenomenon is a function of the spectral emission of the light source and sensitivity of the sensor. To overcome this aspect of the problem of underwater exploration an optimum emission wave length for the light source must be utilized. In addition, to the foregoing factors, the design of a system for underwater exploration must take into consideration such other factors as target reflections, inherent target-to-background contrast, terrain roughness, field angle, search rate platform stability and spacing from light source to light sensor.

The present invention is an optical imaging system utilized for underwater exploration having the unique characteristic of blanking selected portions of the video display screen so that only specific illuminated images of interest are shown. The use of the unique blanking technique as a control mechanism for the signals received by the light sensor device is effectual in eliminating the problems associated in the prior art to provide a system in which backscatter, forwardscatter, spectral emission and the like problems are minimized, if not completely eliminated. More particularly, the system is adaptable to utilize various novel logic circuit arrangements which enables the light sensor of the system to automatically transmit only illuminated images or portions thereof corresponding in size to a portion or all of the collimated scanning light beams of compatible spectral emission which illuminates the target producing the image.

A primary object of the present invention is the provision of an optical imaging apparatus in which the effects of forward scatter and backscatter in underwater exploration are minimized.

Another object of the present invention is the provision of an optical imaging apparatus in which the useful range for underwater mapping and exploration is extended.

Still another object of the present invention is the provision of an optical imaging apparatus in which greater area coverage per unit time is provided.

Yet another object of the present invention is the provision of an optical imaging apparatus in which the signal-to-background noise ratio is reduced to provide enhanced spatial, spectral and tonal resolution to the images displayed by the system.

A further object of the invention is the provision of a unique logic circuit arrangement for utilization in an optical imaging apparatus which blanks all but the selected portions of the video display screen of the apparatus.

A still further object of the invention is the provision of novel logic circuits whereby portions of images corresponding in size to a portion of the illuminating collimated scanning light beam are continuously displayed.

While another object of the invention is the provision of logic circuits whereby the system automatically restricts the size of that portion of the reflected light signal received by the light sensor of the apparatus.

The novel features which are believed to be characteristic of the present invention, both as to its organization and method of construction and operation, together with further objects and advantages thereof, will be better understood from the following description considered in connection with the accompanying drawings in which embodiments of the invention are disclosed by way of examples. It is expressly understood, however, that the drawings are for the purpose of illustration and description only and do not define limitations of the invention.

Figure 1:
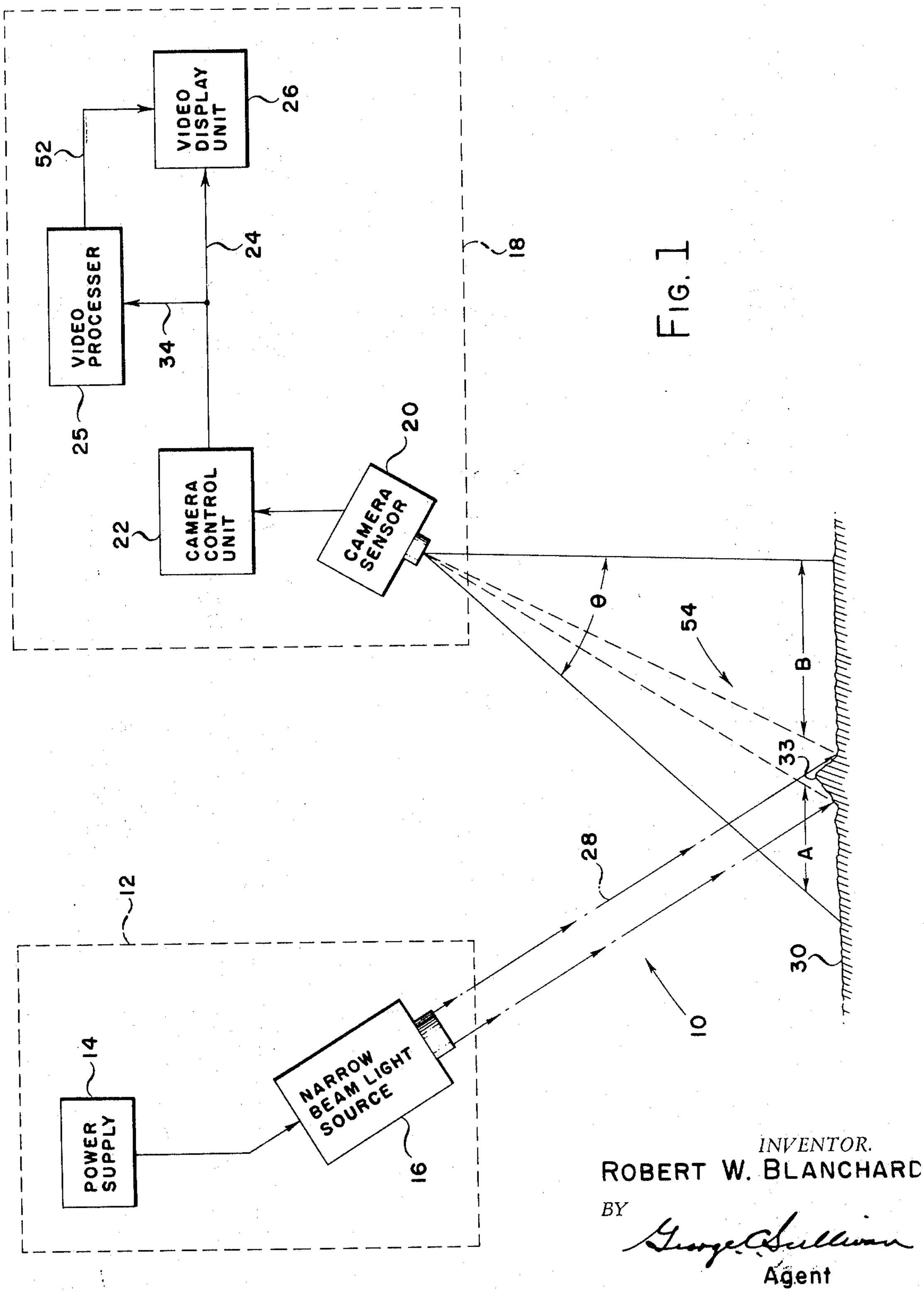
FIG. 1 is a block diagram of an underwater light imaging apparatus illustrating an embodiment of the present invention.

With reference to FIG. 1, there is shown an optical imaging apparatus generally designated 10, consisting of a light beam generator 12, having a power supply 14, electrically connected to a narrow beam light source and scanner 16, and an optical light image detector 18 having an optical image sensor 20 electrically connected to a sensor control unit 22 which is connected to a video processor 25 and a video display unit or screen 26. The output of the video processor 25 is also electrically connected to video display screen 26 by conductor 52 for selective blanking thereof.

As shown in FIG. 1, the power supply 14 which is connected to the narrow beam light scanner 16 is provided to supply the power necessary to operate the light source 16. Narrow beam light source and scanner 16 generates a substantially collimated light beam 28 of predetermined spectral emission which is directed into an underwater environment and is confined to a preselected area which is tracked by light image sensor 20 in a scanning pattern similar to that of an electron gun sweeping the face of a cathode ray tube.

The light image sensor 20 has a wide angle of view, which is designated by theta ($\theta$), as shown in FIG. 1, and a similar angle in a direction perpendicular to the drawing. The area scanned, with respect to ground reference 30 in FIG. 1, is generally rectangular in shape in the embodiment illustrated. The light source and scanner 16 thus scans back and forth within the rectangular area which defines the view of light image sensor 20, as will be discussed in detail hereinbelow.

Figure 2A:
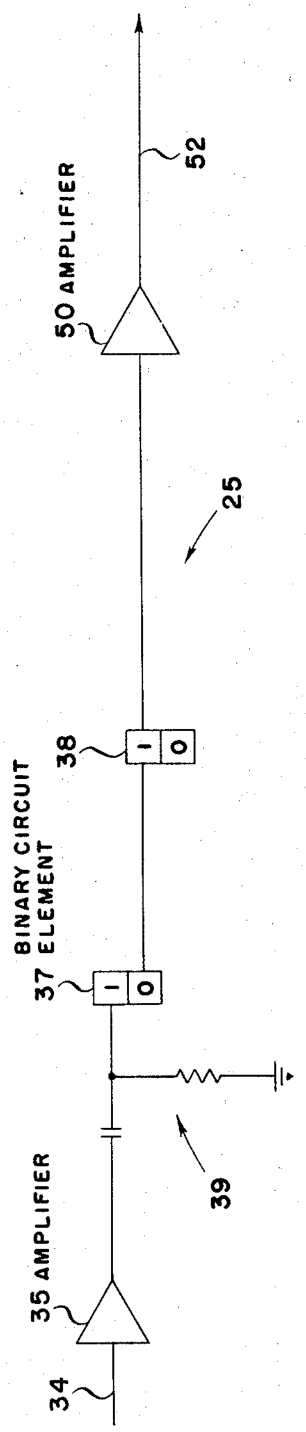
FIGS. 2A, 2B and 2C are diagrams of several unique logic circuit arrangements which may be employed in the apparatus of FIG. 1 for providing selective blanking signals to the video display screen.

Before continuing with the description of FIG. 1, a discussion of the various circuit embodiments of video processor 25 will be given. In FIG. 2A, the video processor circuit arrangement is in its simplest form and comprises an amplifier 35 for receiving a video signal from control unit 22 along conductor 34. The output of amplifier 35 is connected to a differentiating circuit 39 which is in turn connected to the one (1) side of a first binary logic circuit element 37. The zero (0) output of logic element 37 is connected to the one (1) input of a second binary logic element 38 and the one (1) output of logic element 38 is connected to an output amplifier 50 which is connected to display unit 26 by means of conductor 52.

Figures 3A, 3B:
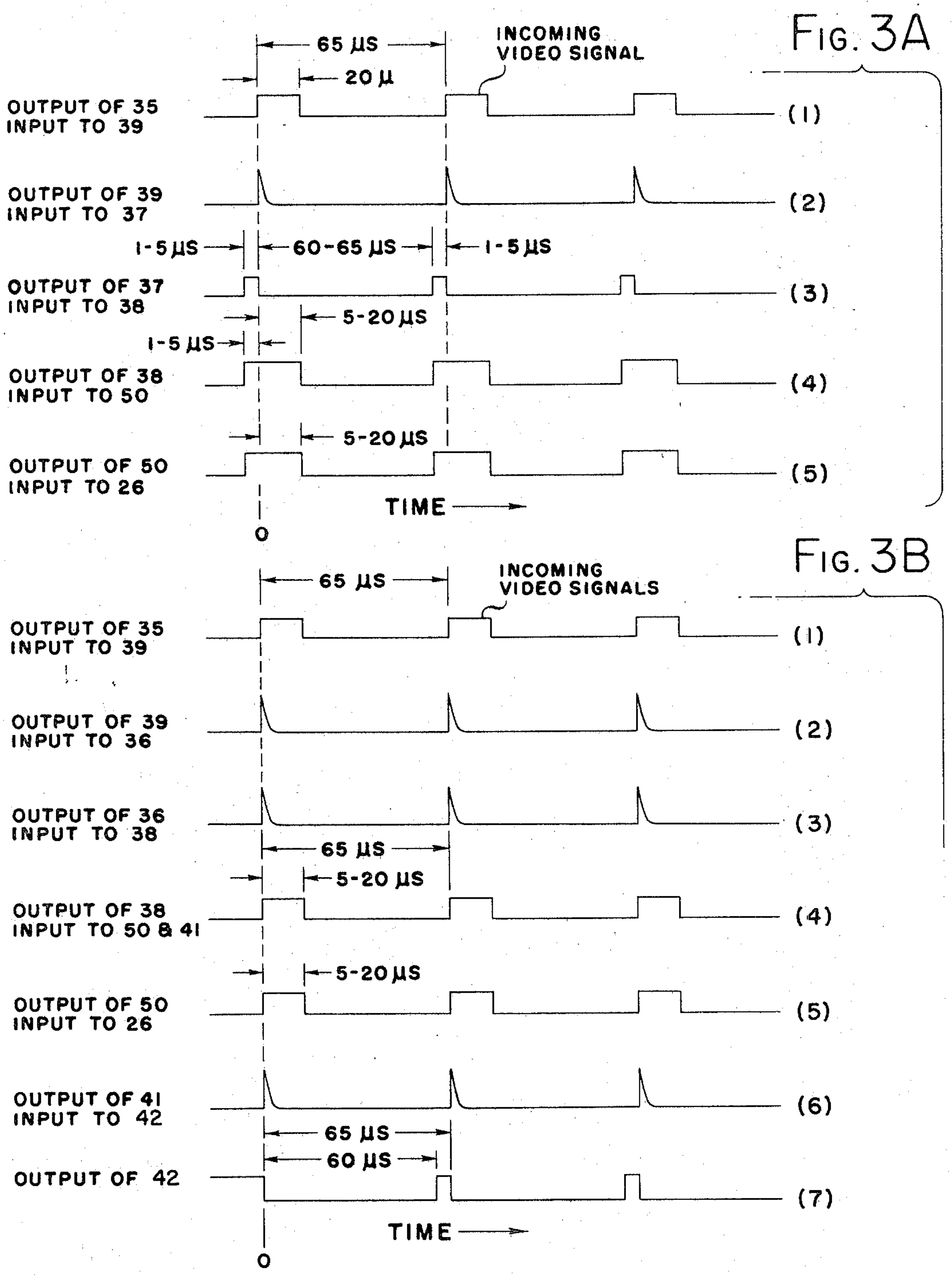
FIGS. 3A, 3B and 3C are waveform diagrams of the signals derived from the operation of logic circuit arrangements of FIGS. 2A, 2B and 2C respectively, used to explain the operation of the logic circuits in the arrangements.
Figure 4A:
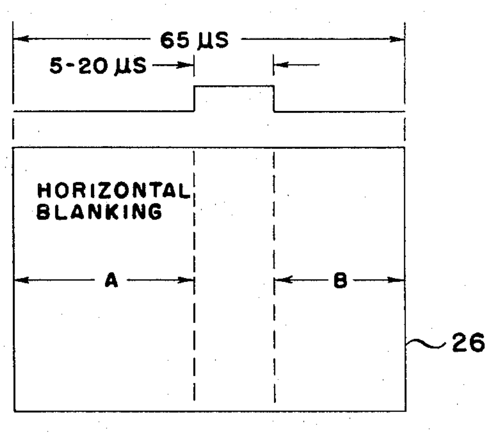
FIGS. 4A, 4B and 4C are drawings illustrating the illuminated video display screen shown in FIG. 1 utilizing the waveforms shown in FIGS. 3A, 3B and 3C respectively.

Operation of logic circuit arrangement 25 shown in FIG. 2A is commenced upon the receipt of a video signal from control unit 22. The waveforms 1 through 5 of FIG. 3A illustrate the waveform of the signal applied to, and the output from the elements of the circuit. The blanking effects on video display screen 26 from the foregoing waveforms is illustrated in FIG. 4A. As shown in FIG. 4A the display screen 26 is unblanked in the vertical areas indicated by the widths between arrows A and B.

Thus, in operation underwater light image apparatus 10 the video processor 25 causes display screen 26 to be blanked out except in the selected area where, an object 33 as shown in FIG. 1, is displayed. It should be noted that binary element 38 has an indicated range of 5 to 20 microseconds which establishes the width of the unblanked portion of the display screen 26 between A and B. It should be further noted that the present invention contemplates the use of a binary element and an associated inductance, a resistance or a capacitance or a combination thereof for varying the length of the time delay of binary element 38.

By means of the foregoing circuit arrangement, video display unit 26 is effectively precluded from receiving signals which do not correspond to the width of object 33 shown in FIG. 1 and defined by the area between A and B in FIG. 4A. Thus maximum illumination from the object 33 is received while the forward and backscatters in areas A and B are eliminated.

Figure 2B:
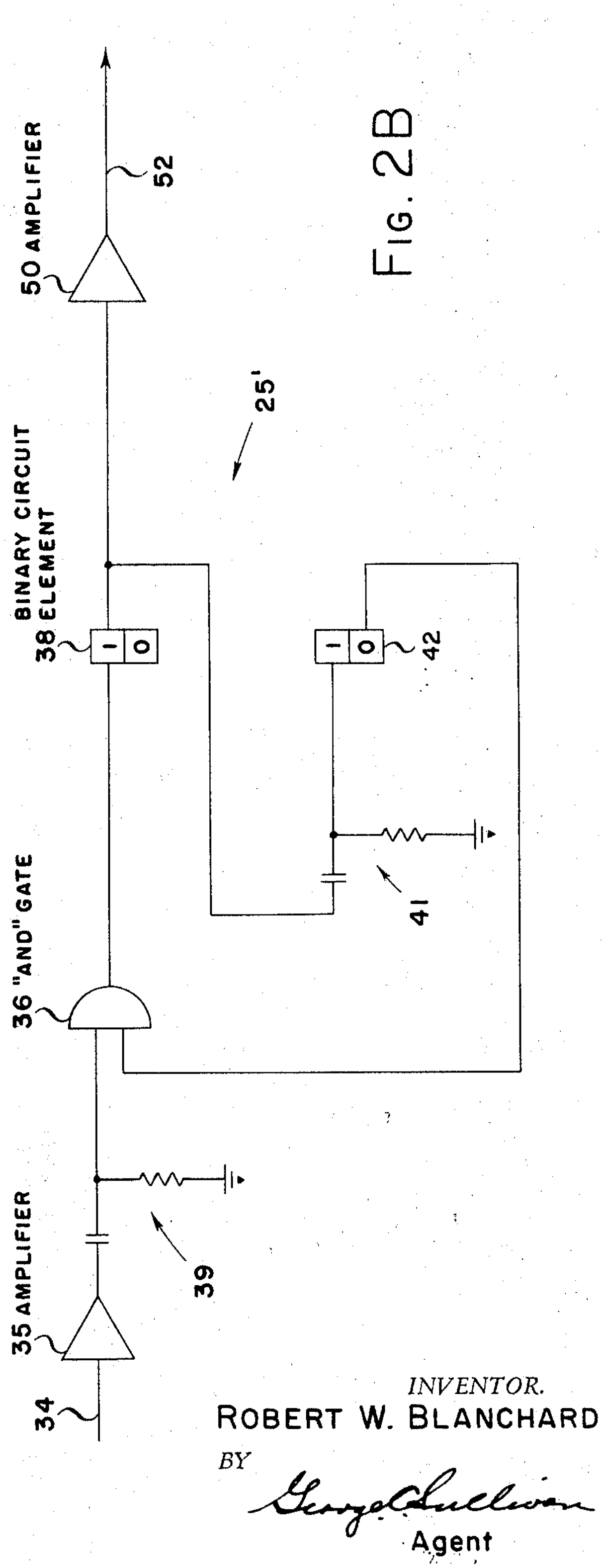

In FIG. 2B, the video processor circuit arrangement is adapted for flexibility and may be utilized for either vertical or horizontal blanking. It comprises an amplifier 35 for receiving a video signal from control unit 22 along conductor 34. The output of amplifier 35 is connected to a first differentiating circuit 39 which is in turn connected to an "AND" gate 36. The output of "AND" gate 36 is connected to one (1) side of a first binary logic circuit element 38, the one (1) output of which is connected to an output amplifier 50 and a second differentiating circuit 41. The output of differentiating circuit 41 is connected to the one (1) input of a second binary logic circuit element 42 and the zero (0) output thereof is connected to a second input of "AND" gate 36.

Operation of the logic circuit arrangement 25' of this embodiment commences as that shown in FIG. 2A, however, it differs in that the 60 microsecond time delay in incoming video signals for horizontal blanking is effectuated through the use of "AND" gate 36 which is initially in the uninhibited state, such that a pulse signal is permitted to pass and is inhibited during the next 60 microsecond period owing to the pulse signal output from binary element 42. From one to five microseconds prior to the next incoming video pulse "AND" gate 36 changes to the uninhibited state as a result of the output of binary element 42 going to the zero (0) condition. This process is repeated for each pulse of the video signal which has a time cycle of 65 microseconds in the embodiment for the horizontal sweep of the display apparatus 26. It should be noted that the circuit arrangement 25' of FIG. 2B may also be utilized for the vertical sweep by changing the timing characteristics of the circuit elements to be compatible with display screen 26.

Figure 4B:
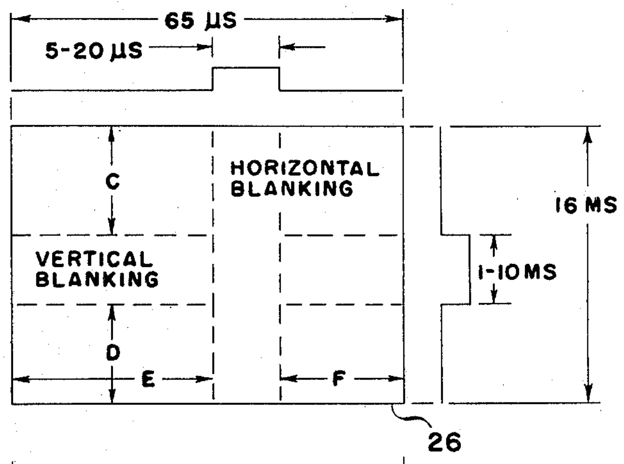

As shown in FIG. 4B, the timing requirements for a horizontal sweep, 65 microseconds, and a vertical sweep, 16 milliseconds are indicated. It should be recognized that the values indicated for the horizontal and vertical sweeps are only exemplary and are not intended as a limitation of the invention. The timing pulses for FIG. 2B are illustrated in FIG. 3B as an aid to facilitate understanding of the operation of the circuit.

Figure 2C:
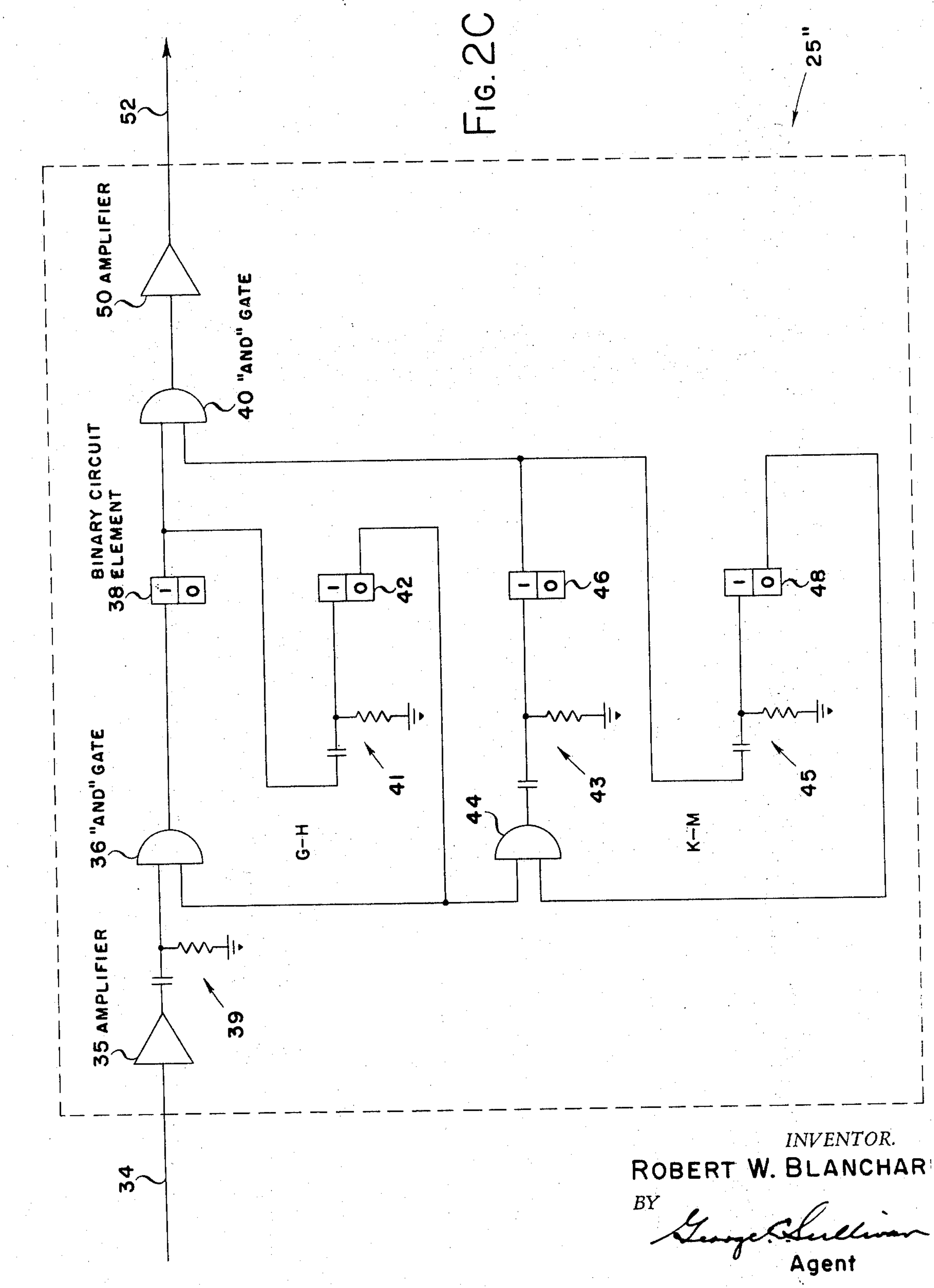
Figure 4C:
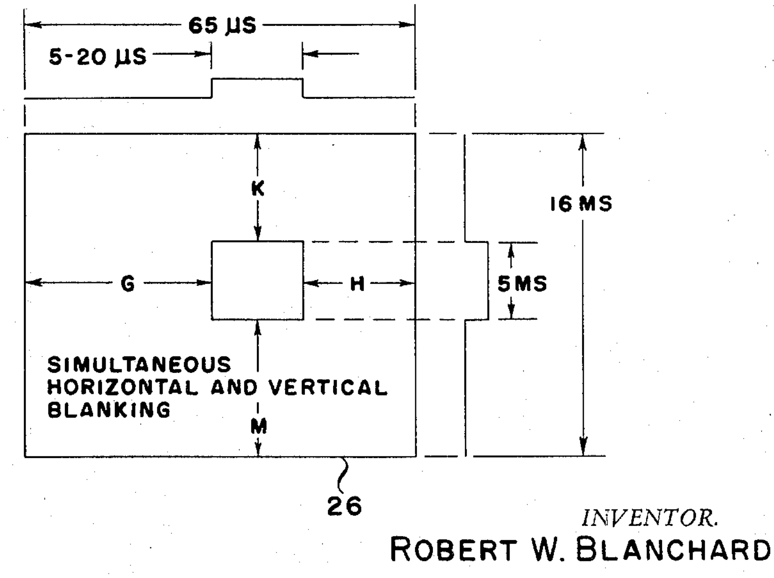

With the discussion of FIG. 2B in mind, a discussion of FIG. 2C will be given, wherein it defines another embodiment of the circuit arrangement 25. The circuit in FIG. 2C permits both the horizontal and vertical sweeps to be blanked simultaneously in preselected areas as illustrated by the blanked areas in FIG. 4C defined by arrows G and H for the horizontal sweep and letters K and M for the vertical sweep. As shown in FIG. 2C, the horizontal sweep is controlled by the upper portion of the circuit arrangement designated G–H and the vertical sweep is controlled by the lower portion of the circuit arrangement designated K–M. These designations correspond to the blanked areas of screen 26 shown in FIG. 4C.

Figure 3C:
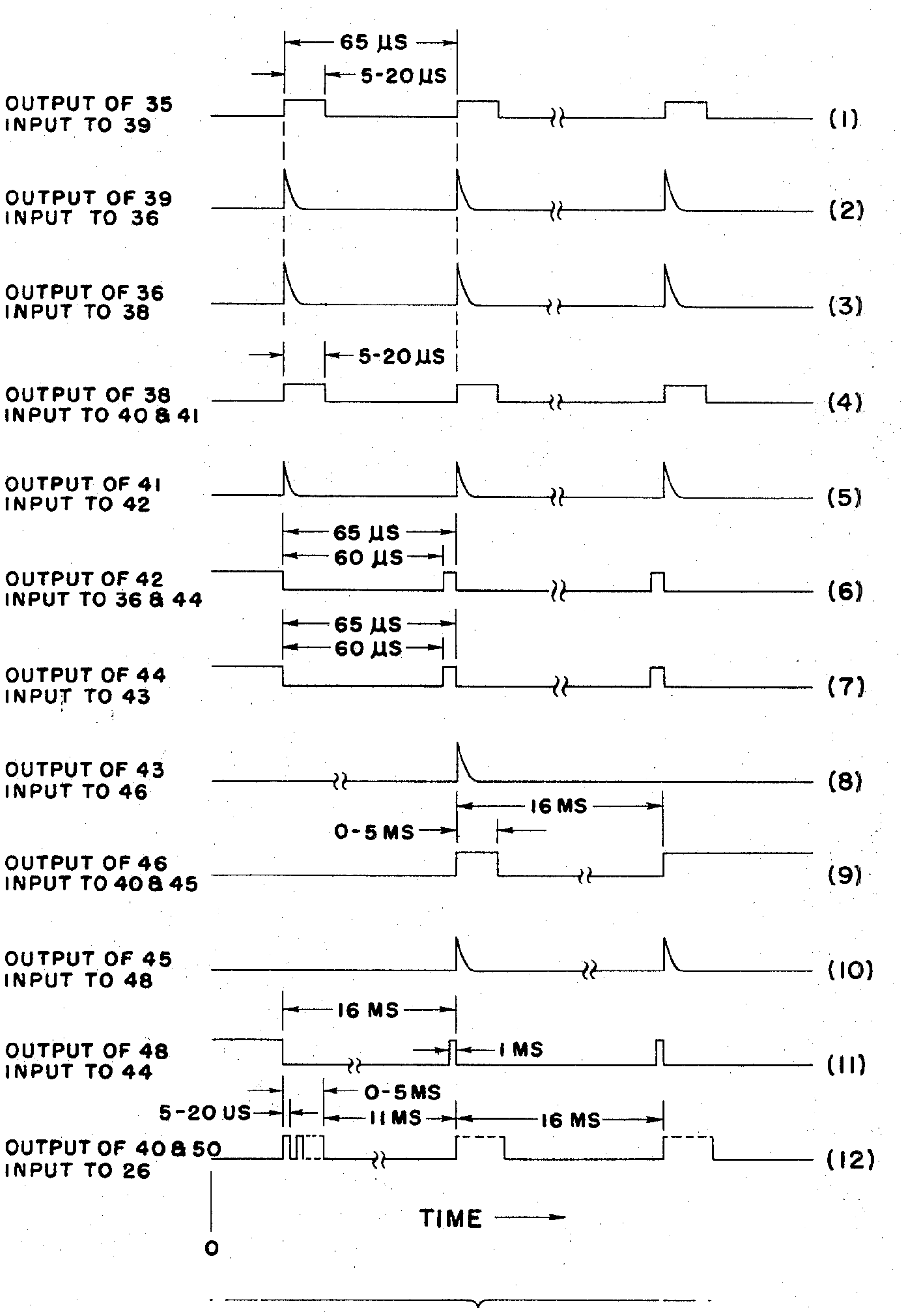

Referring again to FIG. 2C, it may readily be understood by one skilled in the art that FIG. 2C is similar to FIG. 2B, except that there are two circuits the functions of which have been uniquely integrated. More particularly, an additional "AND" gate 40 is included for "ANDING" the output signals of the two circuits to thereby produce integrated signal control. It should be noted that the timing for the horizontal sweep is indicated as 65 microseconds for each cycle which corresponds to a conventional 525 line raster of a cathode ray display while the vertical sweep timing is 16 milliseconds for the same reason. The timing pulses for FIG. 2C are illustrated in FIG. 3C as an aid to facilitate understanding the operation of the circuit.

Thus, from the foregoing discussion of FIGS. 2A–2C, 3A–3C and 4A–4C, it can be seen that blanking of a display screen 26 may be readily controlled by the video processor circuit arrangement 25 of apparatus 10 shown in FIG. 1.

In summary, it can readily be seen that the video processor of the present invention uniquely provides a means whereby backscatter, forwardscatter and other adverse attributes of prior art underwater exploration apparatus may be effectively controlled and decreased. It has been found that the use of the present invention will permit the exploration of underwater environments heretofore impossible. More particularly, objects may be detected and viewed with enhanced clarity at distances on the order of 50 to 150 feet from the light source scanner 16 and sensor 20.

Thus, with the present invention, it is possible to process the video signal in a manner to minimize the effect of backscatter, forwardscatter and other adverse characteristics on the final image shown by the display screen 26. In effect, the video system detects the location of illuminated target images and records them on the storage surface of the sensor and blanks the display screen in all areas except the gated portions of target area measured. This process removes all of the bright areas of scattered light. Although scattered light from a small segment of the column of illuminated water is imaged within the gated area, or pre-selected area, this is the continuing segment, which is is of low brightness as contrasted to the reflected brightness of the illuminated brightness of the illuminated target. By taking advantage of this high-contrast condition, contrast levels in the display screen may be such that the image of the lightscatter is below threshold. The result is a high contrast displayed image of the apparently irregular band of target area which has been illuminated in one sweep of the light source across the target area.

The foregoing process is repeated 65 times per second, the frame rate of a typical sensor, and records a new target image each time. As the narrow light beam is moved from one target area to another or over the face of a large target, the processor senses only the illuminated portion of the target. The display screen may be provided with a retentive phosphor for continuous viewing as the light beam is swept over the target area, and the imagery may be recorded either by the photographing the display screen with a camera shutter held open for one full sweep, or by recording on magnetic tape the processed video signal. In effect, the image of the moving spot may be tracked and the effective field of the image displayed limited to the target area of interest, without the hazard of losing the image in its rapid motion. The resulting image will have high-contrast and the high resulotion.

It is to be understood that the above designated examples are only illustrative of the principles applicable to the invention, and numerous other areas and modifications may be designed by those skilled in the art without departing from the spirit and scope of the invention. Accordingly, it is to be understood that the present invention is limited only by the spirit and scope of the appended claims. The term "means" as used in the appended claims is intended to cover various equivalents for performing the specific function or functions and is not to be construed as limited to the specific embodiment or embodiments shown.

What is claimed is:

1. An apparatus for underwater optical imaging utilizing logic circuitry for blanking portions of the video display, the combination comprising a light scanning device for illumination of target areas in an underwater environment, a light image detector for receiving reflected illumination from a target area, and video display means for displaying preselected areas of said illuminated target area in response to blanking control signals, said video display means being further defined as a video processor having an amplifier connected to a series connected differentiating circuit and a first binary logic circuit element for receiving an input video signal and delaying said input signal a preselected time interval, and a second binary logic circuit connected to said first biary circuit for shaping said input signal whereby a blanking control signal to the video display is effectuated.

2. An optical imaging apparatus for use in underwater exploration, the combination comprising:

(a) a light beam generator device which includes a ppower supply connected to a light source for producing a collimated light beam and means for scanning said beam at a preselected rate and in a preselected target area of interest, and (b) an optical image detector means for receiving illuminated target images from selected portions thereof, said optical image detector having a light sensor, a light sensor signal control unit connected to said light sensor, a video display device connected to the output of said light sensor signal control unit, and a video processor circuit connected to the output of said sensor control unit, the output of said video processor circuit is connected to said video display screen to supply a signal for blanking selected portions of said video display screen in selected target areas scanned by said light beam of said light beam generation device during underwater exploration.

3. An optical imaging process comprising the steps of:

(a) sequentially illuminating with a substantially collimated beam of light minor portions of a preselected target area of interest located within the field of view of an optical sensor;

(b) sensing the optical image of the entire preselected target area with said optical sensor as said minor portions are sequentially illuminated;

(c) converting the sensed optical image of said entire preselected target area to a video signal;

(d) processing said video signal by electronically blanking out substantially all of the video signal except that converted from the sensed optical image of said minor portions of said target area illuminated by said beam of light; and (e) converting the processed video signal to an optical image.

4. The optical imaging process of claim 3 wherein step (d) said video signal is processed by unblanking said video signal upon the occurrence of a predetermined differential increase in signal strength of said video signal for a first period of time substantially corresponding to the maximum period of time for said optical sensor to electronically sweep once across said minor illuminated portion, and blanking out said video signal at the conclusion of said first period of time for a blanked period slightly less than the sweep time of said optical sensor less said first period of time.

5. An optical imaging system comprising:

(a) means for sequentially illuminating minor portions of a preselected underwater target area of interest;

(b) means for sensing the optical image of the entire preselected target area;

(c) means for converting the sensed optical image of said entire preselected target area to a video signal;

(d) means for processing said video signal by electronically blanking out substantially all of said video signal except that converted from the sensed optical image of said minor illuminated portions of said target area; and (e) means for converting the processed video signal to an optical image.

6. The optical imaging system of claim 5 wherein said processing means comprises a binary circuit element electrically connected to said means for converting said sensed optical image and to said means for converting said processed video signal.

References Cited

UNITED STATES PATENTS

| | | | |
|---|---|---|---|
| 2,490,561 | 12/1949 | Ussler. | |
| 2,784,246 | 3/1957 | Hurford. | |
| 3,019,292 | 1/1962 | John | 178—6.8 |
| 3,441,667 | 4/1969 | Novacek | 178—6.8 |
| 3,445,588 | 5/1969 | Nicholson | 178—6.8 |
| 3,446,555 | 5/1969 | Kahn. | |

ROBERT L. GRIFFIN, Primary Examiner

H. W. BRITTON, Assistant Examiner

U.S. Cl. X.R.

178—6.8; 315—22